United States Patent [19]

Liefeld et al.

[11] 3,842,400

[45] Oct. 15, 1974

[54] METHOD AND CIRCUIT ARRANGEMENT FOR DECODING AND CORRECTING INFORMATION TRANSMITTED IN A CONVOLUTIONAL CODE

[75] Inventors: Gustav Liefeld; Charles Kurvin, both of Ottobrunn, Germany

[73] Assignee: Messrschmitt-Bolkow-blohm GmbH, Munich, Germany

[22] Filed: Dec. 1, 1972

[21] Appl. No.: 311,383

[30] Foreign Application Priority Data

Dec. 18, 1971 Germany............................ 2163105

[52] U.S. Cl................ 340/146.1 AQ, 340/146.1 AV

[51] Int. Cl.............................................. G06f 11/12

[58] Field of Search........ 340/146.1 AQ, 146.1 AV, 340/172.5

[56] References Cited

UNITED STATES PATENTS

| | | | |
|---|---|---|---|
| 3,447,132 | 5/1969 | Kohlenberg | 340/146.1 AQ |
| 3,587,042 | 6/1971 | Mitchell | 340/146.1 AQ |
| 3,593,282 | 7/1971 | Tong | 340/146.1 AQ |
| 3,665,396 | 5/1972 | Forney, Jr. | 340/146.1 AQ |

*Primary Examiner*—Charles E. Atkinson
*Attorney, Agent, or Firm*—McGlew & Tuttle

[57] ABSTRACT

The method comprises simplified decoding and correcting of a telemetric binary data flow transmitted at relatively short intervals and coded in a "convolutional code," i.e., a code which expresses the information content by forming, for each bit, for example, two parity bits obtained by selection and combination from a so-called "constraint length" contained in a corresponding shift register. Each pair of bits of the incoming consecutive data flow is checked by logical comparison with each bit of a delayed pair of bits, if necessary corrected, and retransmitted to an output shift register which is substantially a duplicate of the shift register used for encoding and whose logical circuit cooperates in the correction. The correction is controlled so that only one error is admitted for a certain sequence of bits. The circuit arrangement comprises a modulo-2-adder as a first decoder, a correction member, a shift register, adjusted to the constraint length and provided with a parity-bit logical circuit which is connected back to the correction member, as a second decoder, and two two-bit shift registers, the first furnishing information into the modulo-2-adder and the second containing the data delayed and furnishing them separately to the correction member for logical comparison with and correction of the undelayed data. Additional circuits provide for signalizing and counting errors, for blocking the correction, and for synchronizing the operations with the data flow.

12 Claims, 2 Drawing Figures

METHOD AND CIRCUIT ARRANGEMENT FOR DECODING AND CORRECTING INFORMATION TRANSMITTED IN A CONVOLUTIONAL CODE

FIELD OF THE INVENTION

This invention relates to the decoding and correcting of coded digital data and, more particularly, to a novel and simplified method and circuit arrangement for decoding and correcting information transmitted in a "convolutional code."

BACKGROUND OF THE INVENTION

The convolutional code, which is employed more and more frequently, particularly for telemetric problems in astronautics, uses a certain number of bits, from the so-called constraint length, which are combined in modulo-2-adders, for example by applying combinations of different bits predetermined by generator matrices, to produce partiy bits appearing on separate lines which may be interrogated, for example by means of a multiplex switch. The information to be transmitted is written into a stand-by register, comprising a number of places determined by the constraint length, and, for each shifting time, i.e., after each advancing of the information by one place in the register, all the parity bits produced are interrogated by the multiplex switch so that, for each information bit, the number of parity bits obtained and transmitted is equal to the number of parity bits obtained and transmitted is equal to the number of switching points provided to be contacted by the multiplex switch. Preferably, such coders operate with a double bit rate, i.e., with a multiplex switch which, after each shifting of the information in the register by one place, contacts two different lines. On the first line there is applied a parity bit produced by combination of the contents of any number of places, including the first place, of the shift register, corresponding to the first generator matrix, and, on the second line there is applied a parity bit produced in the same manner but additionally including the content of the second place. Thus, the first and the second generator matrices differ from each other by only one member or place. The setting up of such a convolutional code, and also the principle of the construction of a coder set suitable for this purpose, has come to be known, for example, from "Error Correcting Codes" by Peterson and Weldon, published by M.I.T. Press, and also from "New Developments in Convolutional Encoding and Decoding," by Thomas J. Lynch, published in "Nachrichtentechnische Fachberichte," Vol. 40, 1971, VDE-Editor, Berlin, page 168 et seq., particularly pages 172 and 173.

On the reception side, the data encoded in the manner explained above have up to now been decoded with the aid of a buffer for storing the incoming signals, of an equipment imitating the coder, and of a calculating unit. The calculating unit in this case is a computer calculating the bit-hypotheses and the reliability thereof. Thereby, even when the signals are relatively heavily disturbed, a regeneration of the transmitted data is possible. The decoding of data by the aid of a computer is, of course, considerably expensive so that, particularly for small transmission distances and for testing equipments where it can be assued that, during the transmission, the data are only slightly disturbed, there is a need for a more simple method of data decoding.

SUMMARY OF THE INVENTION

In accordance with the invention, there is provided a simple method, of decoding and correcting a flow of data coded in the form of a convolutional code, using a modulo-2-adder as a first decoder and a shift register as a second decoder. This shift register is adjusted to the constraint length of the code, but differs, by one place, from the shift register of the encoder, and is provided with a corresponding parity-bit logical circuit comprisng further modulo-2-adders. The method includes the operations of comparing the data flow D of the first decoder, comprising successive undelayed bits combined, by modulo-2-addition to form successive pairs of undelayed parity bits, with the data flow A, corresponding to the first bit of each delayed pair of bits, and with the data flow B, corresponding to the second bit of the delayed pair of bits, and of restransmitting the data flow D', furnished by a correction member, to the shift register bit by bit in conformity with the following conditions:

1 whenver $A = B = D$, $D' = D$ 2 whenever $A = B \neq D$, $D' = \bar{D}$ 3 whenever $A \neq B$, $D' = D$, where the condition "2" signifies a correction.

Using the afore-described convolutional code at a double bit rate with generator matrices which differ by only one term, or place, the method according to the invention permits decoding data, supplied in the form of this convolutional code, in a simple manner and, at the same time, to a certain extent to recognize and automatically to correct the occurring errors. The received signals are decoded so as to combine each two successive bits, to form a pair of undelayed bits, in a modulo-2-adder representing a first decoder, each first arriving parity bit of the pair being applied to one input and each second arriving parity bit to the other input of the modulo-2-adder. Then, under the condition that the successive bits combined with each other are the right ones forming a pair, the bits appearing at the output of the modulo-2-adder correspond to the uncoded signals which, nevertheless, are still afflicted with the errors occurring during the transmission.

In each of two further modulo-2-adders, also operating as decoders, a respective bit of an arriving pair of parity bits, which pair is delayed, however, by a double pulse compared to the undelayed pair mentioned first, is applied to one of the two inputs. A shift register, which is designed in the same manner as the register of the used coder, but differs therefrom by omission of the first place and provided with a parity-bit logical circuit, is connected to the other input of each of the two further modulo-2-adders. The shift register again produces parity bits. Also, the shift register may be filled with its own decoded data or with the decoded data appearing at the output of the first modulo-2-adder.

In accordance with the invention, if the three produced decoded data flows are, in addition, compared with one another in the correction member, it is possibly not only to recognize whether each of the received and decoded bits is right or wrong contains an error but also, in the latter case, to proceed to an automatic correction of the error-containing bit, by inverting its value. That is, with each bit having only two logical states, namely 0 and 1, a bit recognized as "wrong" automatically becomes right by inversion. The decoded and partially corrected bits are then placed in the shift register wherefrom they may be removed to further processing.

In accordance with a development of the invention method, how frequently the condition "2" appears in a certain number of bits is controlled, i.e., the frequency of the error correction is determined, and then, when a correction is made for the second time within this predetermined number of bits, the data flow is stopped temporarily, as otherwise wrong data are moved into the shift register and the circuit executes corrections which are due not only to errors in the input but also to errors in the shift register, i.e., the operation no longer complies with the intended purpose. To restart the operation in the right manner, the shift register now must be filled with uncorrected data. If these data have been correct, after release, the error correction will function perfectly again.

As soon as the second error occurs within the predetermined number of bits, an error signal can be given to the equipment further processing the decoded data. This signal can be cancelled again when, after restarting the operation of the correction member, no further corrections are to be made.

The number of input bits to be predetermined, within which no more than one single correction is to be made, must be greater than four but should be a multiple thereof, because otherwise there is a risk of producing an output signal which, in conditions of disturbed transmission, has no reference to the uncoded signal, without even perceiving it. It is desirable to choose the number to be predetermined equal to the constraint length.

Inasmuch as, in a data flow, three neighboring bits may be combined to a pair of consecutive bits in two different manners, and only one of these two possibilities is admissible for a correct decoding of the data, there is provided, in accordance with a further development of the invention, that, whenever more than two errors occur, the combination of the neighboring bits is changed, i.e., of three consecutive bits either the first two or the last two are combined to form a pair of bits.

According to another development of the invention, a circuit arrangement is provided for carrying out the method, and comprises a first modulo-2-adder, a correction member, and a shift register which is equipped with a parity-bit logical circuit including further modulo-2-adders and corresponding to the convolutional code to be decoded. In this arrangement, the first modulo-2-adder is connected to the outputs of a first two-bit shift register furnishing the information content, whose input is supplied bit by bit with the data to be decoded and whose further output is connected to a second two-bit shift register each of whose outputs delivering the information content is connected, through a respective further modulo-2-adder, to a respective one of two comparison inputs of the correction member having an input connected to the output of the first modulo-2-adder and whose output is connected to the input of the shift register. At the output of the shift register or, according to the desired delay, at any of the register places, the decoded data may be read off. The parity-bit logical circuit of the shift register is connected to the second inputs of each of the two further modulo-2-adders. The logical circuit of the correction member is designed so that, for the output signals of the correction member transmitted to the shift register, the condition $D' = (\bar{A}B + \bar{B}A)\,D + AB$ must be satisfied, D being the output signal of the first modulo-2-adder and A and B being the signals arriving at the comparison inputs of the correction member.

Owing to this relatively simple circuit arrangement, not only can the arriving data be decoded easily but also, at the same time, errors can be recognized and, to a certain extent, corrected automatically.

In accordance with a further development of the invention, a timing pulse, corresonding to the bit rate of the signal to be decoded, has its frequency divided by two with the aid of a flip-flop. Either of the two pulse sequences, furnished by the respective two outputs of the flip-flop through two respective AND-elements and mutually dephased by 180°, may be selected for controlling the first and second two-bit shift registers, whereby, in each case, two different neighboring bits are combined to form a pair of bits.

With the aid of such a timing pulse which, in a known manner, is divided by a flip-flop into two new timing pulse sequences mutually dephased by 180° and of mutually equal pulse frequency, the two first or the two last bits of three consecutive bits of the arriving data flow may be combined to form a pair, in a simple manner, by triggering only one of the two AND-circuits.

In another development of the invention, there is provided a counter which is triggered by the half frequency timing pulse sequence, and which is able to count up to a certain freely chosen number of bits greater than four input bits, and may be reset, during any counting run, as soone as the condition "2" occurs for the second time.

With the aid of this counter, it is possible, in a simple manner, to control whether only one error or more than one error appears during a pre determined bit-cycle which, according to a further development of the invention and for reasons of simplifying matters, is chosen equal to the constraint length of the respective code. In case at most only one error appears within such a bit-cycle, this error is corrected automatically and the decoded data are re-transmitted to one of the further processing devices. If, on the contrary, two or more erros appear during the bit-cycle, the correction of the data in the correction member is blocked.

In conformity with still another development of the invention, there are provided flip-flop circuits and/or other logical elements which, after the appearing of the condition "2" for the second time, block the correction, in the correction member of the output data of the first modulo-2-adder during the run of the counter and give a signal to a subsequent data processing device.

An object of the invention is to provide a simplified method of decoding and correcting a data sequence expressed in a convolutional code.

Another object of the invention is to provide an improved and simplified circuit arrangement for decoding and correcting a data sequence expressed in a convolutional code.

A further object of the invention is to provide such a method and circuit arrangement in which, when an error occurs more than once in a sequence comprising a predetermined number of input bits, an error signal is supplied to means for further processing the decoded data.

Another object of the invention is to provide such a method and circuit arrangement in which, when an error appears more than once in a sequence comprising a predetermined number of input bits, correction of errors in a correction member is blocked.

A further object of the invention is to provide such a method and circuit arrangement in which the predetermined number of bits is equal to the constraint length of the coded data.

Another object of the invention is to provide such a method and circuit arrangement in which a timing signal, corresponding to the bit rate of the signal to be decoded, has its frequency divided in half to produce two half-frequency timing pulse series used in controlling the decoding of the data.

For an understanding of the principles of the invention, reference is made to the following description of a typical embodiment thereof as illustrated in the accompanying drawings.

DESCRIPTION OF THE PREFERRED EMBODIMENT

Figure 1:
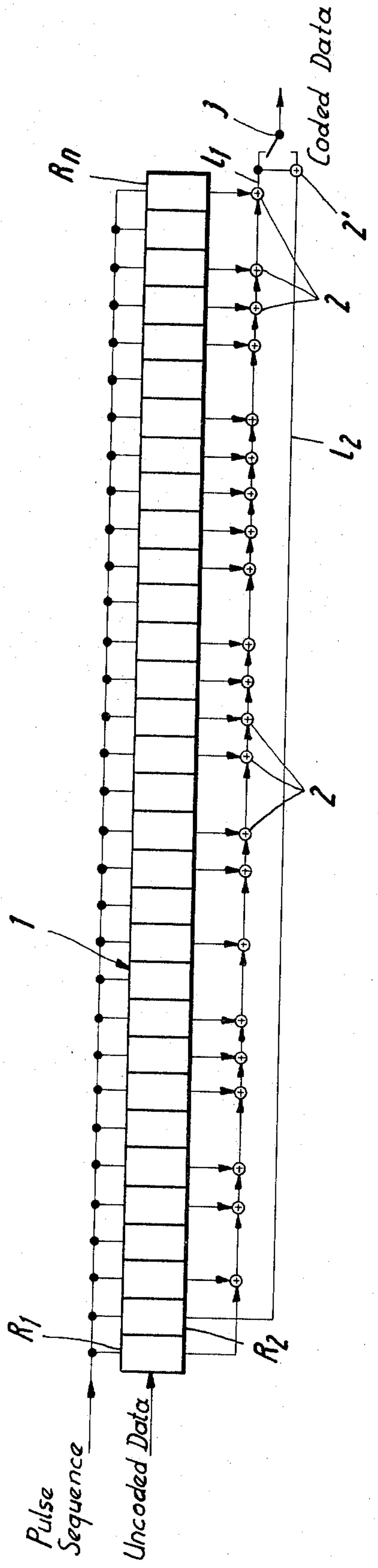
FIG. 1 is a circuit diagram of a known coder for coding data in a convolutional code.

Referring to the drawings in particular, FIG. 1 represents an encoder of the type which is known for transforming a binary information into a convolutional code. As already mentioned, such an encoder comprises a multiplace shift register 1 having a number of places R corresponding to the number of bits representing the respective desired so-called constraint length. In conformity with the chosen generator matrices, the information outputs of a certain number of register places are connected, through a plurality of modulo-2-adders 2, to a line $1_1$ and, by means of a further modulo-2-adder 2', also to a separate second line $1_2$. The first line $1_1$ omits the information output of the second register place $R_2$ and the second line $1_2$, on the contrary, includes the information output of this second register place. Both lines $1_1$ and $1_2$ are connected to a multiplex switch 3 which, at every shifting of the information in the register by one step, interrogates both lines once, i.e., produces two parity bits for each new information bit introduced in the shift register. The two parity bits thus obtained are transmitted by means of appropriate transmitting and receiving stations and, at the other end of the transmission path, recovered, with the aid of a decoder, as the information which has been introduced into the shift register of the coder.

Figure 2:
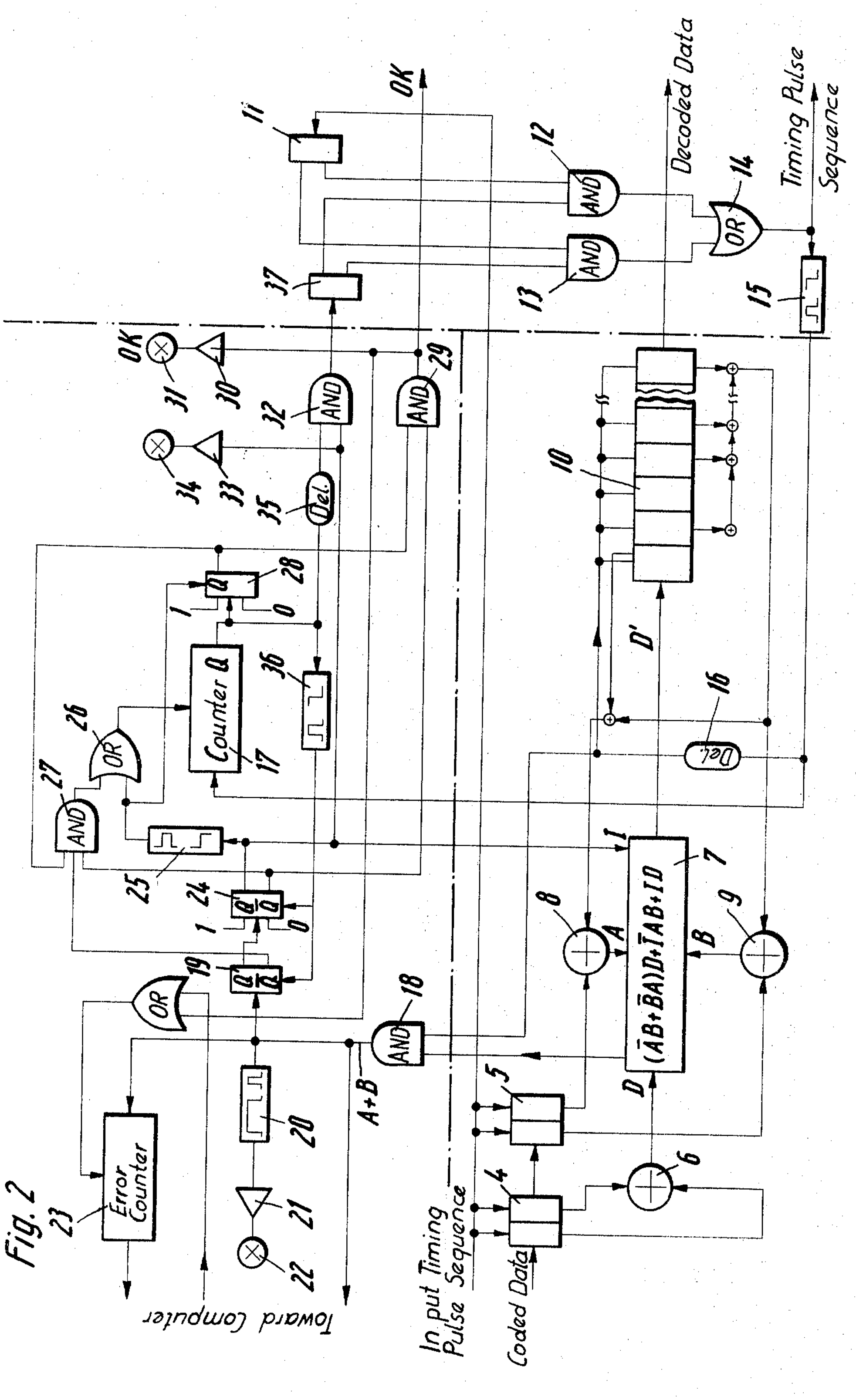
FIG. 2 is a schematic block diagram of a circuit arrangement embodying the invention and capable of performing the method of the invention.

FIG. 2 shows an embodiment of a circuit arrangement, according to the invention, provided for decoding and, at the same time, correcting the data furnished, for example, by a coder represented in FIG. 1. These coded data are entered bit by bit into two series connected two-bit shift registers 4 and 5. The information outputs of the two places of the shift register 4 are combined by a modulo-2-adder 6 at the output of which a first data flow D appears which is transmitted to a correction member 7 whose logical behavior corresponds to the logical equation $D' = (\bar{A}B + \bar{B}A) D + \bar{I}AB + ID$. The significance of the letters will be explained later on.

The correction member 7 receives further data flows A and B furnished over separate lines as output signals of two modulo-2-adders 8 and 9. One of the signals thus furnished is the flow of the first bits and the second the flow of the second bits, of a pair of bits stored in the second two-bit shift register 5 which, owing to the series connection of the two shift registers 4 and 5, is every time delayed by one pair of bits compared to the pair of bits stored in the first shift register 4. The data delivered from the correction member 7 are transmitted to the shift register 10 as the data flow D'. The shift register 10 is basically of the same design as the encoder shown in FIG. 1, except that the first register place and the multiplex switch 3 are omitted. The lines conducting the parity bits of this shift register 10 are connected to the still free inputs of the modulo-2-adders 8 and 9. The decoded and corrected data may be read off at the output of the shift register 10 or at any register place thereof.

The two shift registers 4 and 5 are controlled by a timing pulse frequency which corresponds to the switching time of the multiplex switch 3 used in the coder shown in FIG. 1. The same timing pulse sequence is supplied to the flip-flop circuit 11 whose respective two outputs, consequently, deliver timing pulse sequences whose frequency is one-half the frequency of the input pulse sequence and which are mutually dephased by 180°. Each of these two dephased timing pulse trains sequences is supplied to one of the inputs of a respective one of two AND-elements 12 and 13 whose outputs are combined over in an OR-element 14 so that a half frequency pulse sequence appears at the output of the OR-element 14, and this reduced pulse frequency passes through an appropriate pulse shaper 15 and a delay element 16 to the timing inputs of the shift register 10. The same timing pulse frequency is also supplied, as a counting signal, to a counter 17 which is able, at the most, to count up to the number of bits simultaneously storable in the coder illustrated in FIG. 1, i.e. up to a number corresponding to the constraint length of the used code. The correction member 7 has an additional output at which a signal appears each time when the instantaneous values of the data flows A and B differ from each other. This signal A ≠ B is supplied to one input of an AND-element 18 whose other input also is triggered by the half-frequency timing pulse sequence. The output of AND-element 18 is connected to the input of a flip-flop circuit 19 and also, through an appropriate pulse shaper 20, to an amplifier 21 of a suitable error indicator 22. Moreover, the output of AND-element 18 is connected to the counting input of a counter 23 which counts the occurring errors.

One of the outputs of flip-flop 19 is connected to the input of another flip-flop 24 whose output is connected, through a pulse shaper 25, to one of the inputs of an OR-element 26 whose output is connected to the reset input of the counter 17. Each of the other outputs of flip-flops 19 and 24 is connected to a respective input of an AND-element 27 whose output is connected to the other input of OR-element 26. Thus, as long as there is no signal A ≠ B, the counter 17 stands still. The output of the last counting step of counter 17 is connected to the input of another flip-flop circuit 28 having an output connected to a third input of AND-element 27 and to a first input of an AND-element 29 whose second input is connected to the inverted output of flip-flop 24.

The output of AND-element 29 is connected to a device for processing the decoded data, for example to a computer (not shown), so that this device handles the data only when an OK-signal appears at the output of AND-element 29. The output of AND-element 29 is also connected, through an amplifier 30, to an indicator 31 which indicates that the data just furnished are correct and actually processed by the computer. The output of flip-flop 24 is additionally connected to the input of correction member 7 so that this member stops the correction of the data flow D, whenever and as long as this input received a signal. The same signal is supplied to the input of another AND-element 32 and, through an amplifier 33, to another indicator 34 which indicates that the correction is interrupted.

Through a delay element 35, the second input of AND-element 32 receives the output signal of the last step of counter 17. This latter output signal of counter 17 is also supplied, through a pulse shaper 36, as a reset signal to the two flip-flop circuits 19 and 24. The output of AND-element 32 is connected to a further flip-flop circuit 37 each of whose outputs is connected to the second input of a respective one of the AND-elements 12 and 13, whereby there can be determined which of the two outputs of flip-flop circuit 11, furnishing the reduced frequency timing pulse sequences mutually dephased by 180°, is connected through.

The mode of operation of the inventive circuit arrangement and thereby of the inventive method is as follows:

After switching-on the circuit arrangement represented in FIG. 2, flip-flop circuits 19, 24, 28, as well as counter 17, are in a random position. Thus, the AND-condition of AND-element 29 is not satisfied and the system for data processing receives no OK-signal. To enforce this result, the switching-on must produce a reset pulse for the three flip-flop circuits. The frequency of the input timing pulses is divided by two in flip-flop 11 and, consequently, one of the outputs of flip-flop 11 is connected, through an AND-element 12 or 13 and OR-element 14 to the shift register 10 and to counter 17. At this moment, shift register 10 receives statistically distributed data, i.e., the condition A = B = D is not fulfilled. After a short period of time, the condition A = B will not be fulfilled either, so that flip-flop 19 will switch over and, owing to the no longer satisfied AND-condition of AND-element 27, counter 17 will be cleared.

Shortly thereafter, the condition A = B is not fulfilled again, because shift register 10 continues to receive incorrect data. Therefore, flip-flop 24 also switches over and, through pulse shaper 25, resets counter 17. After the switching-over of flip-flop 24, correction member 7 receives a block signal I so that no bit correction can take place in the correction member until the counter is filled up and flip-flop circuit 24 reset. As a result, for the period of one constraint length, D = D′ bits are written into shift register 10. In the event the timing pulse train or sequence furnished by OR-element 14 has the correct phase, i.e., the right consecutive bits are combined to form pairs of bits, only uncorrected bits pass into shift register 10. If, in the meantime, counter 17 has advanced to a position corresponding to the constraint length, the block signal I disappears. In the case that, during the subsequent same number of bits, only one or no error occurs and that the uncorrected bits did not contain errors, as soon as an error occurs, flip-flop 28 is set and flip-flop 19 is reset. Counter 17 is then stopped and remains stopped because all of the inputs of AND-element 27 receive an 1-signal. Inasmuch as both flip-flop 24 and flip-flop 28 also transmit, to AND-element 29, 1-signals, the OK-signal is given to the device for data processing and the data at the output of the decoder are correct.

As soon as an error occurs, this error is first contained in one of the two places of shift register 4. Thereby, D contains an error and, ithe correction member, D′ is corrected to D, because the condition D = A = B is not fulfilled. The correction takes place during the delay time of delay element 16 so that, owing to the timing pulse sequence, the corrected data are then introduced into shift register 10. Thereupon, one part of shift register 5 contains an error, whereby A ≠ B. Consequently, flip-flop 19 is set and the counter begins its counting run because the reset signal is interrupted. In the event that during the period of the constraint length, no other error occurs, flip-flop 19 is reset and the counter is stopped. The sole occurring error has been corrected. On the contrary, if, during the run of the counter, another error occurs, flip-flop 24 is set, the block signal I appears, and the OK-signal at the output of AND-element 29 disappears.

As already mentioned, this operation takes place under the assumption that the timing pulse sequence supplied from the output of OR-element 14 has the correct phase. If this is not the case, already in the modulo-2-adder 6 two successive odd bits are combined to form a pair of bits. In such a case, the same operation takes place as described above but, after the second run of the counter, errors will appear in addition. The second error appearing during the second run of the counter makes an 1-signal appear at the output of AND-element 32, because an 1-signal is also applied at the output of the last counting step of counter 17 and AND-element 32 also receives, from flip-flop 24, an 1-signal. Flip-flop 24 resets counter 17, wherefore it is necessary to provide a delay element 35 between the output of the counter and AND-element 32. After expiration of the delay, the output signal of AND-element 32 becomes 0 again and the flip-flop 37 switches over. Thereby, however, the respective other AND-element of the AND-elements 12 and 13 is connected through, and a timing pulse sequence, dephased by 180° compared with the pulse sequence furnished before, appears at the output of OR-element 14 and is also supplied to shift register 10 and to counter 17, so that, at present, the other two neighboring bits are combined to form a pair. In this way, it is assured that, any time two or more errors appear repeatedly two or more times during a single run of the counter, the inventive circuit arrangement gives no OK-signal to the computer and the phase position of the combined pair of bits, to be synchronized with the timing pulse sequence, is changed.

It is possible, without departing from the inventive idea, to provide an arrangement with which the phase switching of the timing pulse sequence is operated faster, but which also is more expensive. For such a purpose, for example, the first decoder, the correction member, and the second decoder may be doubled and each set controlled by timing pulses mutually dephased by 180°. In an additional member, a comparison could be made as to which of the two circuits effects few or no corrections and which corrects almost permanently. The output of the circuit effecting few or no corrections could then be connected through to the device for data processing.

While a specific embodiment of the invention has been shown and described in detail to illustrate the application of the principles of the invention, it will be understood that the invention may be embodied otherwise without departing from such principles.

What is claimed is:

1. A method of decoding and correcting a data sequence expressed in a convolutional code, and transmitted as two sequences of parity bits generated, from the information to be coded, by respective generator matrices and which sequences are formed by modulo-2-adders at selected places of a shift register adjusted to the constraint length of the code, the sequence differing at only one place of the shift register, said method comprising the steps of combining successive received parity bits by modulo-2-addition to form pairs of parity bits in a data sequence D; thereafter decoding, wite a time delay, the two parity bits of each pair to form respective data sequences A and B; the parity bits belonging to the information to be coded, due to the time delay, standing at the same place in each of the data sequences A, B and D; comparing the data sequences A, B and D to derive a data sequence D′ containing the uncoded information; and transmitting the data sequence D′, bit by bit, in accordance with the conditions:

1 whenever $A = B = D$, $D' = D$
2 whenever $A = B \neq D$, $D' = \bar{D}$
3, whenever $A \neq B$, $D' = D$;

where the condition "2" signifies a correction.

2. A method, as claimed in claim 1, including the steps of using a first modulo-2-adder as a first decoder to form the pairs of parity bits in the data sequence D; supplying the data sequence D to a correction member connected to the output of the first decoder; supplying the data sequence D′ to a shift register connected to the output of the correction member and differing by one place from the first-mentioned shift register and corresponding thereto from the second place of the first-mentioned shift register onwardly and having an appropriate parity-bit logical circuit consisting of further modulo-2-adders, the second-mentioned shift register constituting a second decoder; deriving two sequences of parity bits from the second-mentioned shift register; supplying the last-mentioned two sequences of parity bits and the two parity-bits of each pair, decoded with a time delay, to respective additional modulo-2-adders to form the data sequences A and B; and supplying the data sequences A and B to the comparison member for comparison therein with the data sequence D to form the data sequence D′.

3. A method, as claimed in claim 1, including the step of, when the condition "2" appears more frequently than once during a sequence including a predetermined number of input bits greater than four, supplying an error signal to a device which processes the decoded data.

4. A method, as claimed in claim 3, including the step of counting the frequency of appearance of condition "2" during each such sequence involving a predetermined number of input bits.

5. A method, as claimed in claim 3, including the step of, when the condition "2" appears more frequently than once during the sequence including a predetermined number of input bits, interrupting correction of the data contained in the correction member for a period equal to the constraint length of the convolutional code.

6. A method, as claimed in claim 4, including the step of, when the condition "2" occurs at least two times during each of two sequences including a predetermined number of input bits, delaying the data flow one bit.

7. A method, as claimed in claim 2, including the step of using the condition "3," which necessarily follows the condition "2," to control the appearance of the condition "2".

8. A circuit arrangement for decoding and correcting a data sequence expressed in a convolutional code, and transmitted as two sequences of parity bits generated, from the information to be coded, by respective generator matrices and which sequences are formed by modfulo-2-adders at selected places of a shift register adjusted to the constraint length of the code, the sequences differing at only one place of the shift register, said circuit arrangement comprising, in combination, a first modulo-2-adder; a correction member; a second shift register corresponding to said first-mentioned shift register and differing by one place from said first-mentioned shift register, said second shift register having two parity bit logical circuits corresponding to those of said first-mentioned shift register from the second step of said first-mentioned shift register onwardly; a first two-bit shift register receiving the data sequence bit-by-bit; a second two-bit shift register connected to said first two-bit shift register to receive therefrom from the data sequence bit-by-bit; means connecting said first modulo-2-adder to the outputs of said first two-bit shift register to receive the information content thereof; means connecting the first input of said correction member to the output of said first modulo-2-adder; respective second modulo-2-adders connecting respective outputs of said second two-bit register to respective comparison inputs of said correction member; means connecting the output of said correction member to the input of said second shift register; the decoded data being available, in accordance with a desired delay, at the output or at any place of said second shift register; and means connecting the parity bit logical circuits of said second shift register to the second inputs of respective second modulo-2-adders; said correction member having a logical circuit, providing for transmission of the correction member output signals to said second shift register, when the condition $D' = (\bar{A}B + \bar{B}A) D + AB$ is fulfilled, in which D is the output signal of said first modulo-2-adder and A and B are signals supplied to the respective comparison inputs of said correction member.

9. A circuit arrangement, as claimed in claim 8, including circuit means supplying thereto a timing pulse sequence corresponding to the bit rate of the signal to be decoded; a flip-flop having said timing pulse sequence supplied to its input, and having a pair of alternately switched outputs whereby, at each output, there is available a second timing pulse sequence having a frequency of one half the frequency of the input timing pulse sequence, with the two second timing pulse sequences being in 180° phase opposition to each other;

a respective AND element connected to each output of said flip-flop; whereby, at the two AND elements, respective timing pulse sequences, having a relative displacement of 180°, are available so that a selected one of the two timing pulse sequences can serve for the timing pulse control of said first and second two bit shift registers.

10. A circuit arrangement, as claimed in claim 9, including a counter triggered by said second timing pulse sequences and effective to count up to a certain number of bits which may be freely chosen and which is greater than four; and means operable to reset said counter within each run of said counter as soon as the condition A = B    D appears for the second time in the same run of said counter.

11. A circuit arrangement, as claimed in claim 10, in which, in order to count, in addition, the bits which may be introduced into said second shift register, said counter is able to count at least up to a number equal to the constraint length of the used code less 1.

12. A circuit arrangement, as claimed in claim 10, comprising a second flip-flop; means connecting the input of said second flip-flop to said correction member to supply, to the input of said second flip-flop, a signal responsive to the condition A ≠ B; a third flip-flop having its input connected to one output of said second flip-flop; said correction member having an inhibit input blocking correction action thereof; and means connecting one output of said third flip-flop to said inhibit input.

* * * * *